US008339759B2

(12) United States Patent
Weil

(10) Patent No.: US 8,339,759 B2
(45) Date of Patent: Dec. 25, 2012

(54) RELOCATABLE POWER TAP WITH SURGE PROTECTOR

(75) Inventor: Eugene A. Weil, Benton Harbor, MI (US)

(73) Assignee: Trippe Manufacturing Co., Chicago, IL (US)

( * ) Notice: Subject to any disclaimer, the term of this patent is extended or adjusted under 35 U.S.C. 154(b) by 138 days.

(21) Appl. No.: 12/955,585

(22) Filed: Nov. 29, 2010

(65) Prior Publication Data

US 2012/0134063 A1 May 31, 2012

(51) Int. Cl.

| | |
|---|---|
| ***H02H 1/00*** | (2006.01) |
| ***H02H 1/04*** | (2006.01) |
| *H02H 3/22* | (2006.01) |
| *H02H 9/06* | (2006.01) |

(52) U.S. Cl. ........................................ 361/118; 361/117

(58) Field of Classification Search .................. 361/118
See application file for complete search history.

(56) References Cited

U.S. PATENT DOCUMENTS

| | | | |
|---|---|---|---|
| 7,375,939 B2 | 5/2008 | Weil | |
| 2002/0126433 A1* | 9/2002 | Hoopes | 361/103 |
| 2003/0043516 A1* | 3/2003 | Ahlstrom et al. | 361/48 |

* cited by examiner

*Primary Examiner* — Dharti Patel

(74) *Attorney, Agent, or Firm* — Michael Best & Friedrich LLP

(57) ABSTRACT

A relocatable power tap that includes a surge protector. The surge protector provides three modes of transient voltage surge protection while limiting leakage current caused by the relocatable power tap to less than a current limit value (e.g., 100 micro-amperes ["μA"]). The surge protector includes a first transient voltage clamp connected between a line conductor and a neutral conductor, a second transient voltage clamp connected between the line conductor and a ground conductor, and a third transient voltage clamp connected between the neutral conductor and the ground conductor. The transient voltage clamps are, for example, varistors having non-linear current-voltage characteristics. In the presence of voltages that exceed the clamping threshold voltages of the transient voltage clamps, the transient voltage clamps are configured to conduct the current associated with the transient voltage.

9 Claims, 3 Drawing Sheets

RELOCATABLE POWER TAP WITH SURGE PROTECTOR

BACKGROUND

In many instances, the number of wall sockets available to access electrical power is inadequate. In those situations, a power strip or similar device may be used to provide additional receptacles. Generally, power strips include a strip of electrical outlets or receptacles in a housing. The receptacles in the housing are connected to an electrical cord with a plug designed to be inserted into a wall outlet. As is well known, a typical wall outlet (in the U.S.A.) is wired to provide a single-phase, 120 V, AC signal and includes three contacts: a live or hot contact (or lead or conductor), a neutral contact, and a ground or earth contact. Power strips are also known as plug boards, power boards, power bars, distribution boards, gang-plugs, and multiboxes. Underwriters Laboratories Inc. ("UL") refers to power strips as "relocatable power taps" (each an "RPT"). Hereafter, the term relocatable power tap will be used as a generic term to encompass all forms of such devices.

Although RPT's have been in use for many years, there has been some controversy regarding their use in hospitals, dental and doctor offices, and other healthcare facilities. Many healthcare facilities are faced with an increasing use of patient monitoring devices, medication dispensers, and other electrical devices that, of course, must be provided with electrical power. As a consequence, some medical facilities use RPT's to provide extra electrical outlets in order to power the increasing number of devices used in the healthcare industry. Like many electric devices, RPT's may be subject to compliance with the National Electric Code ("NEC"). In addition, customers (e.g., hospitals) and manufactures may desire that RPT's be certified by recognized agencies or testing laboratories, such as UL. However, UL has published guidelines that indicate that RPT's that undergo UL's certification are not intended for use in patient care areas of healthcare facilities even when the RPT's include individual components that meet so-called hospital grade standards.

As a consequence, many healthcare facilities are left with unsatisfactory choices: use a non-certified RPT or install additional fixed outlets (e.g., wall outlets). Of course, it is often impractical to install more fixed outlets because, for example, the installation would require cutting open walls, floors, or ceilings and running additional wiring from electrical service panels to the desired location, and these types of construction activities often require shutting down a healthcare facility. Further, using extra wall outlets is often less desirable than using an RPT because when devices are connected to wall outlets a power cord is strung or laid out from the device to the wall. When multiple devices are connected in this fashion, multiple cords presenting multiple tripping and obstruction hazards are present in the healthcare area. In contrast, by their very nature, RPT's allow multiple cords to be connected to a single location (the group or strip of receptacles of the RPT). Further, the RPT may be placed on, e.g., an equipment cart, and a single power cord (the RPT's cord) run or routed to the wall outlet.

SUMMARY

As a consequence, it would be desirable to have a hospital-grade RPT that meets the requirements of widely adopted electrical codes, such as Article 517 of the NEC, as well the requirements of certification agencies, such as UL Standard 60601-1.

As noted, an RPT is designed to connect several pieces of electrical equipment to a single branch circuit outlet via a single power cord with an attachment plug. The grounding pin of the RPT attachment plug is generally the route through which potentially hazardous leakage current is grounded. Under UL standards, RPT's must meet strict requirements with respect to reducing electrical shock hazards. Shock hazards can be caused by electrical faults, including a loss of ground or ground fault.

The grounding pin in an RPT attachment plug is the means to route potentially hazardous leakage current to ground. Since each piece of medical equipment attached to the RPT contributes a certain amount of leakage current, the accumulated leakage current of several pieces of medical equipment may create the risk of electric shock in the absence of a proper ground. A ground fault may occur for a variety or reasons. For example, a ground fault may occur if the grounding pin of the RPT attachment plug is damaged or removed. Other electrical faults, such as a polarity reversal (caused, e.g., by inadvertently switching the hot and neutral wires in an outlet) can also be problematic. For example, a polarity reversal in a wall outlet may cause a device connected to the RPT to malfunction.

In addition to the faults described above, an RPT used in a healthcare facility is susceptible to transient voltage surges or spikes. These transient voltage surges and the associated electrical currents are particularly hazardous to sensitive medical equipment. To ensure that the medical equipment is adequately protected from a variety of faults and transient voltage surges, the RPTs used in healthcare facilities should also include transient voltage suppression circuitry that provides comprehensive transient voltage surge protection while limiting the leakage current caused by the RPT (e.g., leakage current is limited to approximately 100 micro-amperes ["μA"] or less). The leakage current caused by the RPT is limited in such a manner unless, for example, there is an open-ground condition.

Accordingly, in one embodiment, the invention provides a relocatable power tap that includes a surge protector. The surge protector includes three modes of transient voltage suppression. The first mode of transient voltage suppression is between a hot conductor and a neutral conductor. The second mode of transient voltage suppression is between the hot conductor and a ground conductor, and the third mode of transient voltage suppression is between the neutral conductor and the ground conductor. The surge protector is also configured such that the leakage current to the ground conductor caused by the relocatable power tap is less than approximately 100 μA.

In another embodiment, the invention provides a relocatable power tap which cuts off power to or prevents power from being provided to the receptacles in the RPT when a ground fault is detected. The relocatable power tap also cuts off power to or prevents power from being supplied to the receptacles in the RPT if a reverse polarity situation has occurred.

In another embodiment, the invention provides a relocatable power tap including a line conductor, a neutral conductor, and a ground conductor. The relocatable power tap also includes a receptacle and a surge protector. The surge protector is configured to operate in a first mode and a second mode and includes a first electrical clamp, a second electrical clamp, a third electrical clamp, and a fourth electrical clamp. The first electrical clamp is connected between the line conductor and the neutral conductor. The first electrical clamp is configured to limit the flow of current to the receptacle when the surge protector is operating in the second mode and a first voltage between the line conductor and the neutral conductor exceeds a first threshold value. The second electrical clamp is connected between the line conductor and the ground conductor. The second electrical clamp is configured to limit the flow of current to the receptacle when the surge protector is operating in the second mode and a second voltage between the line conductor and the ground conductor exceeds a second threshold value. The third electrical clamp is connected between the neutral conductor and the ground conductor. The third electrical clamp is configured to limit the flow of current to the receptacle when the surge protector is operating in the second mode and a third voltage between the neutral conductor and the ground conductor exceeds a third threshold value. The fourth electrical clamp is connected between the second electrical clamp and the ground conductor. The fourth electrical clamp is also connected between the third electrical clamp and the ground conductor. The fourth electrical clamp is configured to prevent a leakage current caused by the relocatable power tap from exceeding a current limit when the surge protector is operating in the first mode.

In another embodiment, the invention provides a relocatable power tap that includes at least one receptacle, a power supply, a fault detector, a power switch, and a surge protector. The power supply is configured to convert an AC signal to a DC signal, and the fault detector is configured to determine the existence of ground and polarity faults in a power source. The fault detector includes a first current-controlled switch configured to turn on if an open, ground, or polarity fault exists. The power switch is controlled by the fault detector, is connected to the power supply, and is configured to communicate AC power from the power source to the at least one receptacle according to whether the fault detector detects a fault. The power switch includes a second current-controlled switch that is controlled by the first current-controlled switch. The surge protector is configured to operate in a first mode and a second mode and includes a first electrical clamp, a second electrical clamp, a third electrical clamp, and a fourth electrical clamp. The first electrical clamp is connected between the line conductor and the neutral conductor. The first electrical clamp is configured to limit the flow of current to the at least one receptacle when the surge protector is operating in the second mode and a first voltage between the line conductor and the neutral conductor exceeds a first threshold value. The second electrical clamp is connected between the line conductor and the ground conductor. The second electrical clamp is configured to limit the flow of current to the at least one receptacle when the surge protector is operating in the second mode and a second voltage between the line conductor and the ground conductor exceeds a second threshold value. The third electrical clamp is connected between the neutral conductor and the ground conductor. The third electrical clamp is configured to limit the flow of current to the at least one receptacle when the surge protector is operating in the second mode and a third voltage between the neutral conductor and the ground conductor exceeds a third threshold value. The fourth electrical clamp is configured to prevent a leakage current caused by the relocatable power tap from exceeding a current limit when the surge protector is operating in the first mode. The relocatable power tap also includes a path to a ground that is connected to the at least one receptacle.

In another embodiment, the invention provides a relocatable power tap that includes a line conductor, a neutral conductor, and a ground conductor. The relocatable power tap also includes a receptacle and a surge protector. The surge protector is configured to operate in a first mode and a second mode, and prevent a leakage current caused by the relocatable power tap from exceeding a current limit when the surge protector is operating in the first mode. The surge protector includes a first transient voltage clamp, a second transient voltage clamp, and a third transient voltage clamp. The first transient voltage clamp is connected between the line conductor and the neutral conductor. The first transient voltage clamp is configured to limit the flow of current to the receptacle when the surge protector is operating in the second mode and a first voltage between the line conductor and the neutral conductor exceeds a first threshold value. The second transient voltage clamp is connected between the line conductor and the ground conductor. The second transient voltage clamp is configured to limit the flow of current to the receptacle when the surge protector is operating in the second mode and a second voltage between the line conductor and the ground conductor exceeds a second threshold value. The third transient voltage clamp is connected between the neutral conductor and the ground conductor. The third electrical clamp is configured to limit the flow of current to the receptacle when the surge protector is operating in the second mode and a third voltage between the neutral conductor and the ground conductor exceeds a third threshold value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention described herein relates to a relocatable power tap that includes a surge protector and a plurality of additional safety features. The additional safety features include, for example, a fault detector that is configured to detect ground and polarity faults. The surge protector is configured to provide three modes of transient voltage surge protection while limiting leakage current caused by the relocatable power tap to less than a current limit value (e.g., 100 micro-amperes ["μA"]). The current limit value is less than the leakage current caused by a power tap having a conventional surge protector (e.g., a leakage current of approximately 300-500 μA). The leakage current caused by the relocatable power tap refers to the leakage current that results from components and electrical connections within the relocatable power tap. The leakage current caused by the relocatable power tap does not include leakage currents associated with devices that are plugged into the relocatable power tap. The leakage current caused by the relocatable power tap passes through the ground conductor of the relocatable power tap to provide a safe patient environment. The surge protector includes a first transient voltage clamp connected between a line conductor and a neutral conductor, a second transient voltage clamp connected between the line conductor and a ground conductor, and a third transient voltage clamp connected between the neutral conductor and the ground conductor. The transient voltage clamps are, for example, varistors having non-linear current-voltage characteristics. In the presence of voltages that exceed the clamping threshold voltages of the transient voltage clamps, the transient voltage clamps begin conducting the currents associated with the transient voltage and limit the flow of current to one or more power receptacles. The surge protector also includes a fourth device (e.g., a gas discharge tube) that is configured to substantially isolate the second transient voltage clamp and the third transient voltage clamp from the ground conductor, and limit the leakage current caused by the relocatable power tap to less than the current limit value.

The general operation of the relocatable power tap is described below with respect to FIGS. 1 and 2. The surge protector and the interactions between the surge protector and the other components within the relocatable power tap are described with respect to FIG. 3.

Figure 1:
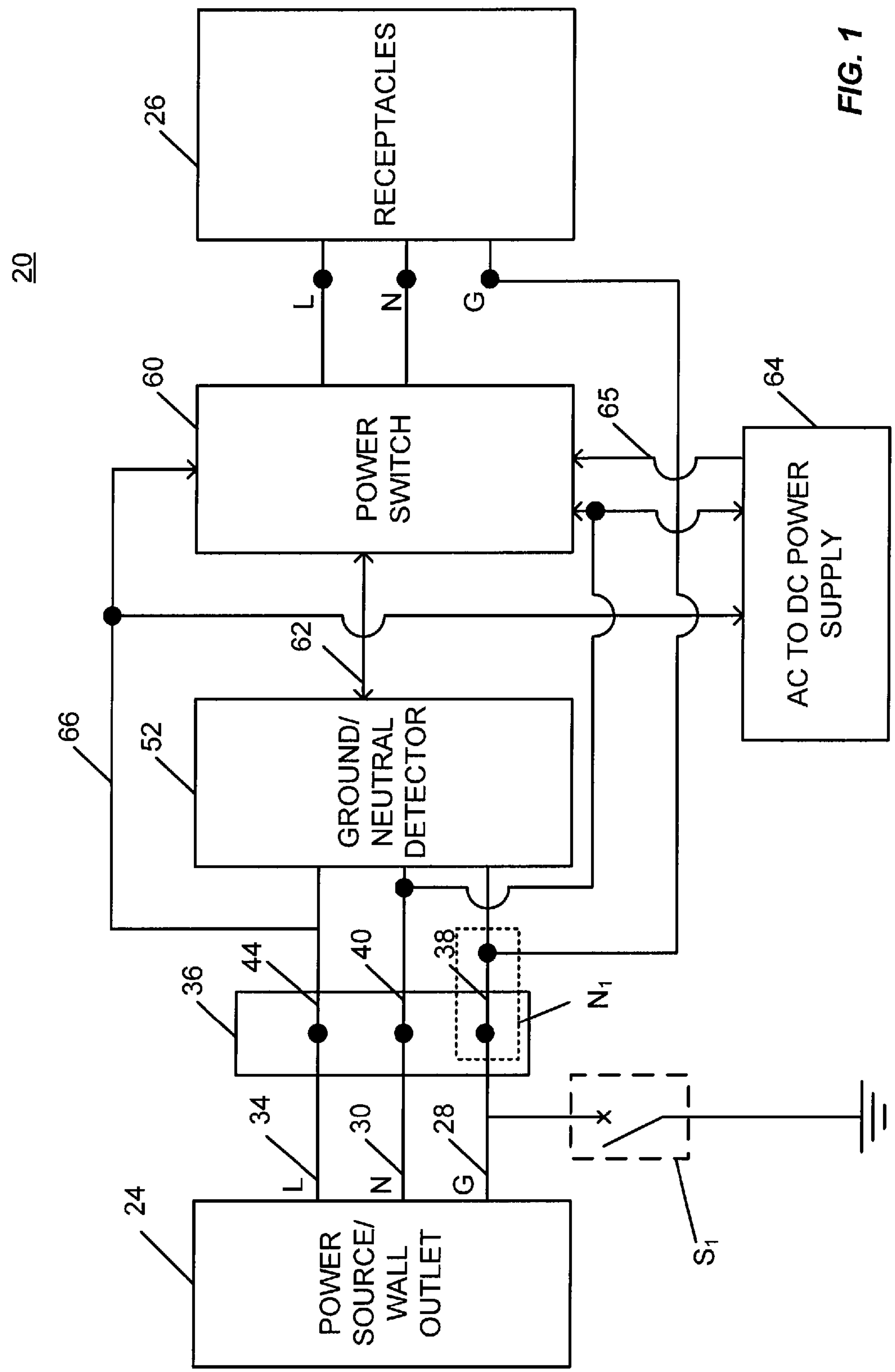
FIG. 1 is a block diagram of a relocatable power tap connected to a power source.

FIG. 1 schematically illustrates a relocatable power tap 20 that is connected to and designed to transfer AC power ("line power") available from an AC power source ("line source" or "power source") 24, such as a wall outlet, to receptacles 26. The line source 24 includes a ground conductor 28, a neutral conductor 30, and a hot or line conductor 34. The relocatable power tap 20 connects to the power source 24 via a plug 36 (shown schematically). The plug 36 has a ground conductor 38, a neutral conductor 40, and line conductor 44. The relocatable power tap 20 includes a ground/neutral detection circuit or fault detector 52 that detects faults, such as loss of ground (or ground fault) and a polarity fault (such as a reverse wiring of the line and neutral conductors in the power source 24). The relocatable power tap 20 includes a normally-open, power switch 60 that provides the line power to the receptacles 26 depending on whether any faults are detected. As will be discussed in greater detail below, the relocatable power tap 20 provides the line power to loads coupled to the receptacles 26 only after no faults have been detected by the detector 52. Thus, potentially dangerous touch currents on the loads, which may result from defective insulation or liquid exposure, may be avoided. In addition, damage to the loads coupled with the receptacles may also be avoided. Further, if a fault is detected while line power is being provided to the receptacles 26, the relocatable power tap detector 52 will control the switch 60 so that the switch opens to interrupt the supply of power to the receptacles.

When the relocatable power tap 20 is coupled to the line source 24 (e.g., when the plug 36 is plugged into a wall outlet), the fault detector 52 checks for defects, such as a ground fault or reverse polarity situation. If no defects are detected, the fault detector 52 controls power switch 60 via communication link 62 so that power is transferred to the receptacles 26. A power converter or supply 64 receives line power from the line source 24, converts the AC signal from the line source 24 into a DC signal or an approximation of a DC signal. As will be discussed in greater detail below, in one embodiment the power supply 64 performs a half-wave rectification of the AC signal from the line source. This rectified signal is delivered to the power switch 60 along line 65. The AC power from the line source 24 is delivered to the power switch 60 on line 66.

The fault detector 52 monitors node N1 to detect one or more fault conditions. For example, in the case where an electrician fails to properly connect the ground conductor 28 to a ground, a ground wire is cut or disconnected, a ground pin in a plug is broken, or some other condition arises where improper grounding occurs (which is shown schematically by a switch S1 in an open position) (note that switch S1 is not part of the invention or the circuit shown in FIG. 1, but used solely for purposes of illustrating a ground fault or open ground condition), a non-zero potential exists at node N1. As will be discussed in greater detail below with respect to FIG. 2, in one embodiment, the fault detector is configured to operate when the potential at node N1 is very small. In one embodiment, an inherent, open-ground leakage current in a path that includes resistors R5 and R6 of less than 30 μA is sufficient to cause the fault detector 52 to control the power switch 60. When there is no ground fault, any leakage current is drained to ground. As will also be discussed in greater detail below, if a reverse polarity situation occurs, the fault detector 52 controls the power switch 60 to keep it open.

The fault detector 52 communicates with the power switch 60 via a trigger signal. If, for example, the fault detector 52 does not detect any ground faults or polarity reversals, the fault detector 52 will communicate a trigger signal on the link 62 to the power switch 60. In response, the power switch 60 will close and the line power is provided to the receptacles 26. If the fault detector 52 detects one or more faults in the line source 24, the fault detector 52 does not provide a trigger signal to the power switch 60. As a result, the power switch 60 will not close.

Figure 2:
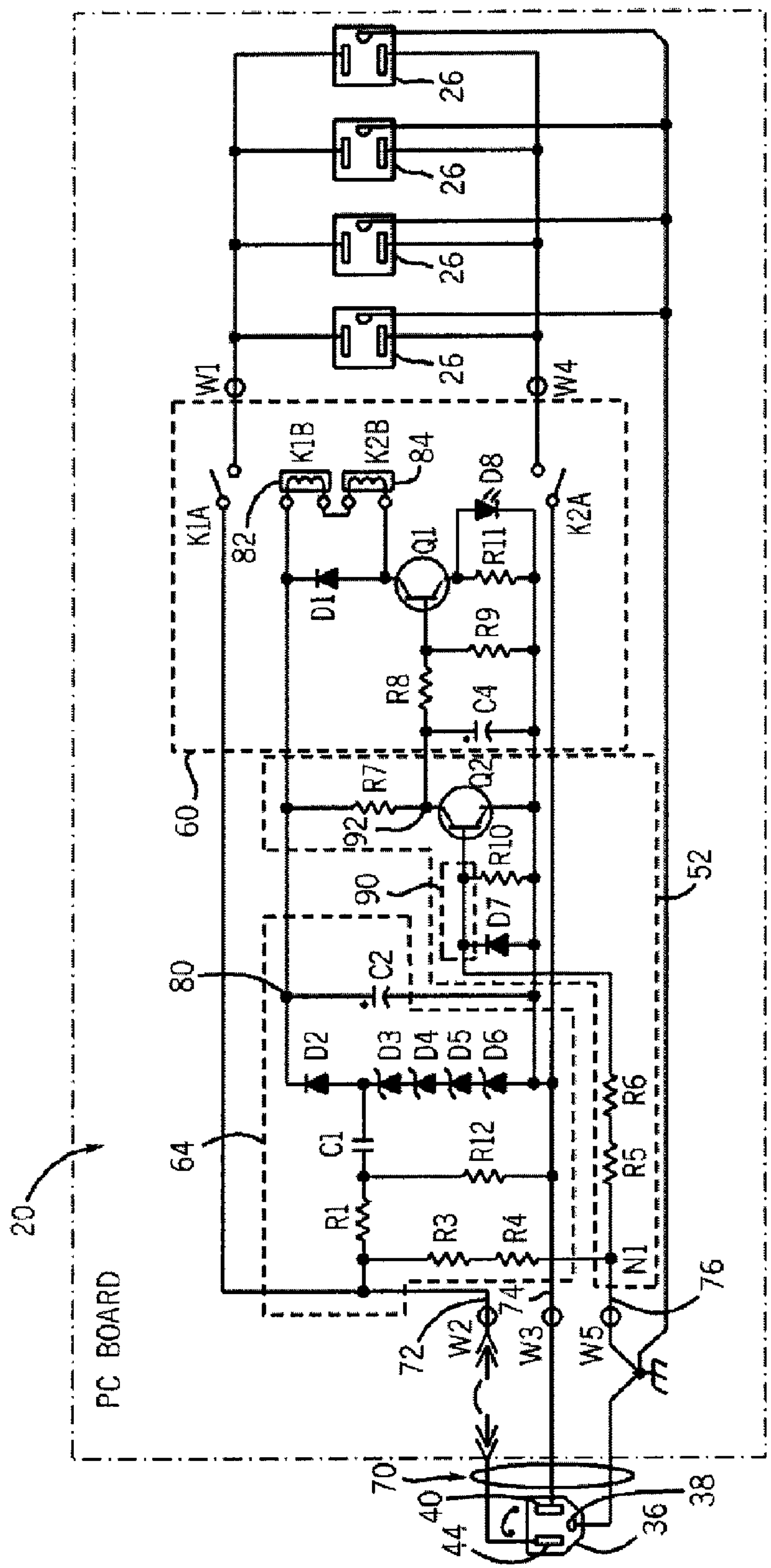
FIG. 2 is a circuit diagram of a relocatable power tap.

FIG. 2 is a more detailed circuit diagram of the relocatable power tap 20. The relocatable power tap 20 includes the plug 36 (which may be a NEMA 5-15P Hospital Grade Plug), and a power cord 70 (such as a 15-foot long, 14 AWG, AC cord). The cord 70 connects to a line or hot node 72, a neutral node 74, and a ground node 76 (which is the same as node N1 from FIG. 1). The relocatable power tap 20 also includes the power supply 64, the ground-neutral detector 52, and the power switch 60. As noted, the power switch 60 controls the transfer of power to or energization of the receptacles 26. In one embodiment, the relocatable power tap 20 includes four receptacles 26 housed in a metal case. The receptacles may be NEMA 5-15R Hospital Grade Receptacles.

In normal operation, meaning that the outlet or line source 24 to which the plug 36 is connected is properly wired and properly grounded, a 120 V AC signal is supplied to node 72. In addition, the neutral node 74 is at a low or zero potential with respect to the ground node 76, and the ground node 76 is connected to a ground potential (presumably a low or zero potential). In practice, when the line source is properly configured, the ground node 76 is connected to the ground at an electric service panel or circuit breaker service box (not shown) and the potential difference between neutral and ground is usually less than 6 volts. The 120 V AC signal is delivered to the power supply 64, which includes resistor R1, capacitor C1, diode D2, and capacitor C2. Resistor R1 and capacitor C1 condition the AC signal received from node 72 and diode D2 half-wave rectifies the AC signal. Capacitor C2 helps smooth the half-wave rectified signal so that it more closely approximates a DC signal. However, there is still some time-varying component in the signal at node 80. This component is commonly referred to as a ripple. Although a full-wave rectifier can be used, a half-wave rectifier converter tends to be less expensive. In addition, it is also desirable to design the power supply 64 so that it is able to cope with variations in the power actually available from a wall outlet. In the embodiment shown, the rectifier can handle input signals ranging from about 90 to 140 VAC. Even though outlets are supposed to provide 120 VAC, this does not always happen in practice.

The power supply 64 also includes four, series-connected 12 volt Zener diodes D3-D6, which limit the maximum voltage at the positive side of capacitor C2 (or node 80) to approximately 48V. A different number of Zener diodes, such as one Zener diode rated at 48V, could be used to limit the voltage. The neutral node 74 forms the negative or low potential side of the power supply 64.

The signal at node 80 drives the coils K1B and K2B of relays K1 and K2 of power switch 60. (Note that sometimes the term power switch is used to refer to only those components that directly control the provision of power to the receptacles, e.g., the relays.) When the coils K1B and K2B are energized (i.e., a current is flowing through them), contacts K1A and K2A are closed. When the contacts K1A and K2A are closed, nodes 72 and 74 are connected to the receptacles 26. Although the presence of a signal at node 80 is necessary to energize the relays K1 and K2, the relays will not close unless a path to a low potential (i.e., node 74) is provided through Q1. In other words, Q1 must be switched on before the relays K1 and K2 can be closed. As will be discussed, in greater detail, transistor Q1 is controlled by transistor Q2. It should also be noted that one or more triacs could be used instead of relays K1 and K2.

The control node or base 90 of Q2 is connected to node 76 (or N1) through resistors R5 and R6. If a potential exists at node 76 (such as when an open ground exists), a small base or turn-on current is provided to Q2 through resistors R3, R4, R5, and R6. If the line source is wired incorrectly (i.e., the line and neutral leads are reversed with respect to a connected ground), the line node 72 is at a low potential and the neutral node 74 is at high potential. When the relocatable power tap 20 is connected to an improperly wired outlet or line source (in other words a polarity fault exists), resistors R3 and R4 are pulled high with respect to the neutral (node 74), even if the ground node 76 is properly connected.

In response to a base current through R5 and R6, Q2 turns on and the voltage at Q2's collector 92 is pulled low. This, in turn, turns off Q1 (i.e., any current that may have been available to the base of Q1 is now directed to a low potential). As noted, if Q1 is off, the relays K1 and K2 are not energized and power is not provided to the receptacles.

If there is no ground or reverse polarity fault, Q2 is off. In addition, resistors R7 and R8 supply a base current (trigger signal) to transistor Q1, which enables transistor Q1 to conduct. The current from resistor R7 is filtered to help reduce the ripple component by capacitor C4 and resistor R8. When conducting, transistor Q1 is a low-side switch and allows current to flow through resistor R11, light-emitting diode ("LED") D8, and coils K1B and K2B. LED D8 is used to provide a visual indication to an end user that two conditions exist: 1) a proper ground and 2) correct wiring of the line source. In other words, LED D8 is lit when no faults exist. In general, the LED D8 is a type of lamp and other lamps or lights could be used. In addition, other types of indications or indicators (such as buzzers, LCDs, etc.) could be used in place of or in addition to the LED D8.

In one embodiment, transistor Q2 is a high-gain, Darlington-type transistor. Super or high Beta transistors might also be used. Under normal conditions (i.e., no ground fault and no polarity reversal), Q2 is held off by resistor R10.

Figure 3:
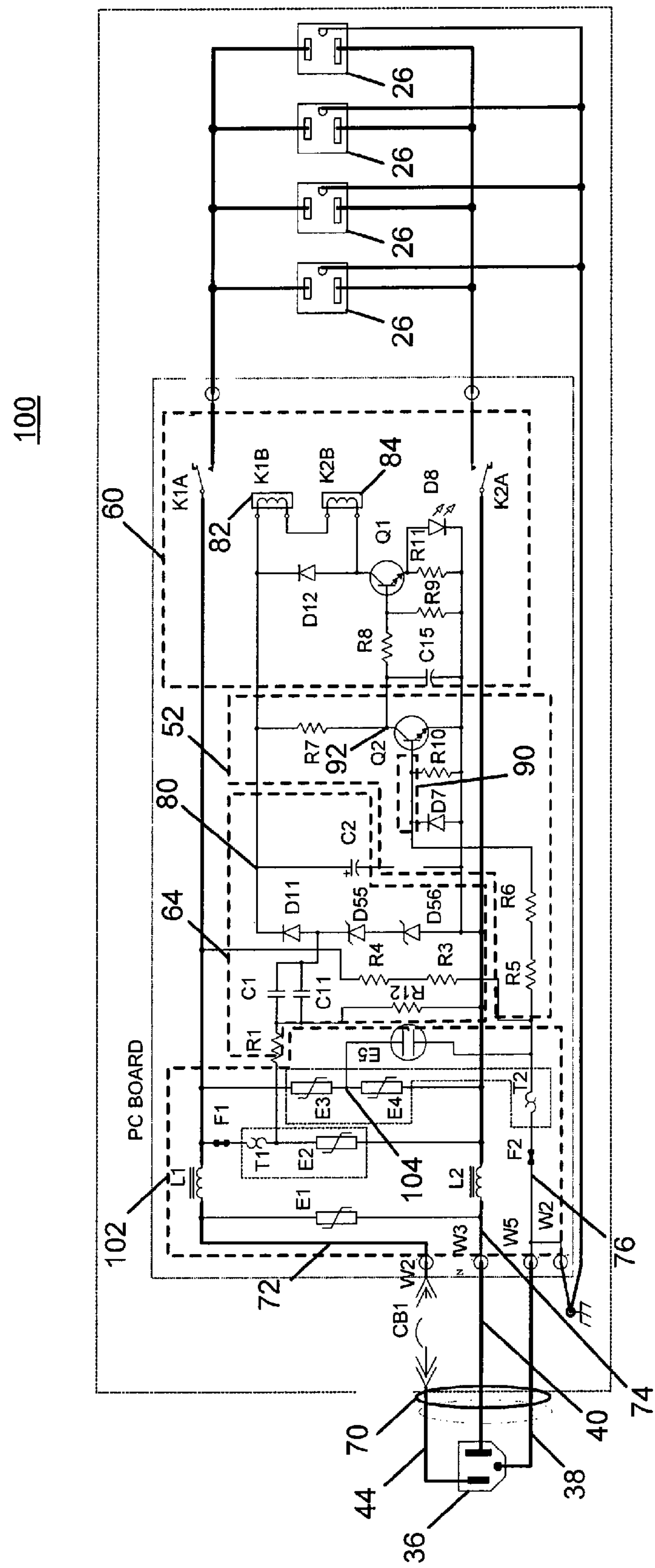
FIG. 3 is a circuit diagram of a relocatable power tap that includes a surge protector.

FIG. 3 is a circuit diagram for a relocatable power tap 100 that also includes a surge protector 102. The relocatable power tap 100 includes a plug 36 (e.g., a NEMA 5-15P Hospital Grade Plug) and a power cord 70 (e.g., a 15 ft, 14 AWG, AC cord). The power cord 70 connects to a line or hot node 44, a neutral node 40, and a ground node 38. The relocatable power tap 100 also includes the power supply 64, the ground-neutral detector 52, and the power switch 60. As described above, the power switch 60 controls the transfer of power to or energization of the receptacles 26. In one embodiment, the relocatable power tap 100 includes four receptacles 26 (e.g., NEMA 5-15R Hospital Grade Receptacles) housed in a metal case. In other embodiments, more (e.g., six) or fewer (e.g., two) receptacles are included in the power tap 100.

The surge protector 102 includes surge suppression circuitry and components that are configured to clamp or shunt electrical currents caused by transient voltages. For example, the surge protector 102 includes a first electrical clamp E1, a second electrical clamp E2, a third electrical clamp E3, a fourth electrical clamp E4, a fifth electrical clamp E5, a first fuse F1, a second fuse F2, a first thermal disconnect T1, and a second thermal disconnect T2. The first, second, third, fourth, and fifth electrical clamps are, for example, transient voltage clamps having non-linear voltage-current characteristics (e.g., varistors, diodes, gas discharge tubes, etc.) The clamps within the surge protector 102 are configured to provide, among other things, three modes of transient voltage surge protection. The three modes of transient voltage surge protection include (1) line-to-neutral, (2) line-to-ground, and (3) neutral-to-ground voltage surge protection. The surge protector 102 is also configured to limit the leakage current to ground caused by the relocatable power tap to less than a current limit value.

As described above, one of the most significant problems associated with using relocatable power taps in healthcare environments is the potential for harmful leakage currents. Conventionally, adding surge protection to a power tap significantly increases the amount of leakage current to ground. The increased leakage current can prohibit compliance with various NEC and UL regulations and prevent the power taps from being used in highly-sensitive environments, such as patient care areas of healthcare facilities, which often have stricter leakage current requirements than UL. As such, in some embodiments, the current limit value for the relocatable power tap 100 including the surge protector 102 is approximately 100 μA, despite having two transient surge protection modes connected to ground. In the event of a failure of the electrical clamps E2, E3, or E4, the surge protector 102 is configured to disconnect the output receptacles 26 (i.e., prevent current flow to the receptacles 26) or limit the current flow to the receptacles 26 (i.e., divert excessive leakage current away from the receptacles 26). The failure of the electrical clamps E2, E3, and E4 includes, for example, catastrophic failure (e.g., exceeding the clamps' absolute maximum current rating), or operating in the non-linear portion of the clamps' current-voltage characteristic in order to conduct the high electrical currents associated with transient voltage surges for an extended period of time.

The surge protector 102 is described with respect to three modes of operation. A first or normal mode of operation corresponds to a mode of operation in which each of the first, second, third, and fourth electrical clamps are conducting little or no current (i.e., the clamping threshold voltages for the electrical clamps are not being exceeded). In the first mode of operation, the receptacles 26 are receiving power from the power supply 64. A second mode of operation corresponds to a mode of operation in which at least one of the first, second, third, and fourth electrical clamps are conducting more than an arbitrary amount of current. For example, if a clamping threshold voltage of the electrical clamp E2 is exceeded, the corresponding current is diverted to the neutral conductor 74. If a clamping threshold voltage of the electrical clamps E3 or E4 is exceeded, the corresponding current is diverted to the ground conductor 76 and away from the receptacles 26. During the second mode of operation, the receptacles 26 remain powered, and the surge protector 102 limits the amount of current that is provided to the receptacles 26. A third mode of operation or fault mode corresponds to a mode of operation in which at least one of the second, third, and fourth electrical clamps has failed (i.e., suffered a catastrophic failure). Such a failure can cause the first fuse F1, the second fuse F2, the first thermal disconnect T1, or the second thermal disconnect T2 to open, as described below. As a result of such a failure, power is no longer provided to the receptacles 26.

The first electrical clamp E1, the second electrical clamp E2, the third electrical clamp E3, and the fourth electrical clamp E4 are rated for clamping threshold voltages of, for example, approximately ±400V and can conduct between approximately 40 and 12,000 A of current. In some embodiments, each of the electrical clamps E2-E4 has the same clamping threshold voltage, and the electrical clamp E1 has a clamping threshold voltage that is approximately twice the clamping threshold voltages of E2-E4. In other embodiments, one or more of the electrical clamps E1-E4 have different clamping threshold voltage ratings.

During the first mode of operation, the resistor R1 (e.g., a fusible resistor) provides current to the relay power supply 64, and the receptacles 26 are powered as described above with respect to FIG. 2. If a sufficient transient voltage appears between the line conductor 72 and the neutral conductor 74, the line conductor 72 and the ground conductor 76, or the neutral conductor 74 and the ground conductor 76, the surge protector 102 operates in the second mode of operation and excess current is diverted away from the receptacles 26. If the sufficient transient voltage appears between the line conductor 72 and the ground conductor 76 or the neutral conductor 74 and the ground conductor 76, the fifth electrical clamp E5 (e.g., a gas discharge tube) ionizes. Following the ionization of the fifth electrical clamp E5, the third electrical clamp E3 and the fourth electrical clamp E4 are connected to the ground conductor 76 through the second fuse F2 and the second thermal disconnect T2, and the current associated with the transient voltage is clamped or shunted to the ground conductor 76. In some embodiments, the fifth electrical clamp E5 has an ionization voltage of approximately 30 volts.

In the third mode of operation, if the second electrical clamp E2 fails (i.e., catastrophic failure) the first fuse F1 or the first thermal disconnect T1 opens. When the first fuse F1 or the first thermal disconnect T1 are opened, the power supply 64 is disabled and the relays 82 and 84 are prevented from being energized. As a result, the receptacles 26 are disconnected from the power supply 64 (i.e., do not receive current) and a power-OK LED D8 is turned off or deactivated. The first fuse F1 and the first thermal disconnect T1 are also configured to protect the second electrical clamp E2 from possible fire generation by opening in the presence of excessive currents caused by transient voltage surges.

The third and fourth electrical clamps E3 and E4 share a common node 104 that is connected to the fifth electrical clamp E5. The fifth electrical clamp E5 is connected between the third and fourth electrical clamps E3 and E4 and the ground conductor 76 through the second fuse F2 and the second thermal disconnect T2. The second thermal disconnect T2 is connected in series with the second fuse F2 and is configured to make the connection to the ground conductor 76 to provide transient voltage protection between the neutral conductor 74 and the ground conductor 76 and the line conductor 72 and the ground conductor 76. If either or both of the third electrical clamp and the fourth electrical clamp E3 and E4 fail, the second fuse F2 or the second thermal disconnect T2 open. Ground sensing resistors R5 and R6 connect to the common node 104 of the fifth electrical clamp E5 to the transistor Q2. If either of the second fuse F2 or the second thermal disconnect T2 are opened, the ground sensing resistors R5 and R6 are pulled to a high voltage by resistors R3 and R4, and the transistor Q2 is turned on. When the transistor Q2 turns on, the base current for the transistor Q1 is removed, and the transistor Q1 is turned off. Turning off the transistor Q1 de-energizes the relays 82 and 84 and disconnects the receptacles 26 from the power supply 64.

The third and fourth electrical clamps E3 and E4 have an impedance characteristic similar to that of a small capacitor when the electrical clamps are operating in a normal mode of operation. During the normal mode of operation, the third and fourth electrical clamps E3 and E4 would act as if they were in parallel during standardized leakage current tests. However, the fifth electrical clamp E5 has an isolating effect on the third and fourth electrical clamps E3 and E4. When operating in its normal (i.e., non-ionized) state, the fifth electrical clamp E5 has less than approximately 5 pico-farads ("pF") of capacitance. As a result, each of the third and fourth electrical clamps E3 and E4 adds less than approximately 2 μA to the total leakage current caused by the relocatable power tap. As such, the surge protector 102 achieves three modes of transient voltage surge protection while limiting the leakage current caused by the relocatable power tap to less than approximately 100 μA.

Thus, the invention provides, among other things, a system and method for surge protection in a relocatable power tap. Various features and advantages of the invention are set forth in the following claims.

What is claimed is:

1. A relocatable power tap comprising:

at least one receptacle;

a power supply configured to convert an AC signal to a DC signal;

a fault detector configured to determine the existence of ground and polarity faults in a power source, the fault detector including a first current-controlled switch configured to turn on if an open, ground, or polarity fault exists;

a power switch controlled by the fault detector, connected to the power supply, and configured to communicate AC power from the power source to the at least one receptacle according to whether the fault detector detects a fault, the power switch including a second current-controlled switch controlled by the first current-controlled switch;

a path to a ground connected to the at least one receptacle; and a surge protector configured to operate in a first mode and a second mode, the surge protector including a first electrical clamp connected between the line conductor and the neutral conductor, the first electrical clamp configured to limit the flow of current to the at least one receptacle when the surge protector is in the second mode of operation and a first voltage between the line conductor and the neutral conductor exceeds a first threshold value, a second electrical clamp connected between the line conductor and the ground conductor, the second electrical clamp configured to limit the flow of current to the at least one receptacle when the surge protector is in the second mode of operation and a second voltage between the line conductor and the ground conductor exceeds a second threshold value, a third electrical clamp connected between the neutral conductor and the ground conductor, the third electrical clamp configured to limit the flow of current to the at least one receptacle when the surge protector is in the second mode of operation and a third voltage between the neutral conductor and the ground conductor exceeds a third threshold value, and a fourth electrical clamp configured to prevent a leakage current caused by the relocatable power tap from exceeding a current limit when the surge protector is operating in the first mode.

2. The relocatable power tap of claim 1, wherein the fault detector is further configured to generate a human recognizable indication when no faults are detected.

3. The relocatable power tap of claim 2, wherein the human recognizable indication is light generated by a light emitting diode.

4. The relocatable power tap of claim 1, wherein the power switch includes a normally-open switch.

5. The relocatable power tap of claim 3, wherein the power switch includes at least one relay.

6. The relocatable power tap of claim 1, wherein the power supply includes a half-wave rectifier.

7. The relocatable power tap of claim 1, wherein the power supply includes one or more series connected diodes.

8. The relocatable power tap of claim 1, wherein the fault detector is further configured to drain a leakage current to ground.

9. The relocatable power tap of claim 1, wherein the current limit is 100 micro-amperes or less.

* * * * *